(12) United States Patent
Chen et al.

(10) Patent No.: US 6,870,976 B2
(45) Date of Patent: Mar. 22, 2005

(54) FILTER BASED MULTIPLEXER/ DEMULTIPLEXER COMPONENT

(75) Inventors: Yeou-Yen Chen, Saratoga, CA (US); Joseph Vanniasinkam, Scarborough (CA); Jon Meyer, Fremont, CA (US); Chris Carroll, Santa Clara, CA (US); Joseph Wai, Los Altos, CA (US); Christopher Viray, Sunnyvale, CA (US); Bill Reysen, Lafayette, CO (US); Bor-Long Twu, Sunnyvale, CA (US)

(73) Assignee: Opnext, Inc., Fremont, CA (US)

( * ) Notice: Subject to any disclaimer, the term of this patent is extended or adjusted under 35 U.S.C. 154(b) by 488 days.

(21) Appl. No.: 09/808,197

(22) Filed: Mar. 13, 2001

(65) Prior Publication Data
US 2004/0101247 A1 May 27, 2004

(51) Int. Cl.[7] .............. G02B 6/12; B29D 11/00; H04J 14/02
(52) U.S. Cl. .............. 385/14; 385/24; 385/31; 385/33; 385/15; 264/1.1; 264/1.24; 264/1.25; 398/79; 398/82; 398/85
(58) Field of Search .............. 385/14, 15, 24, 385/31, 32, 33, 34, 139, 92, 93, 88; 264/1.1, 1.24, 1.25, 2.1, 2.7; 359/124, 115, 127, 131; 398/79, 82, 85, 43, 41, 88

(56) References Cited

U.S. PATENT DOCUMENTS

| | | | |
|---|---|---|---|
| 4,244,045 A | | 1/1981 | Nosu et al. .............. 385/31 X |
| 4,718,744 A | | 1/1988 | Manning .............. 385/33 X |
| 4,842,357 A | * | 6/1989 | Doneen .............. 385/12 |
| 5,708,743 A | | 1/1998 | DeAndrea et al. .............. 385/88 |
| 5,894,535 A | | 4/1999 | Lemoff et al. .............. 385/47 |
| 5,943,149 A | * | 8/1999 | Cearns et al. .............. 359/124 |
| 6,137,933 A | * | 10/2000 | Hunter et al. .............. 385/37 |
| 6,198,864 B1 | * | 3/2001 | Lemoff et al. .............. 385/47 |
| 6,256,428 B1 | * | 7/2001 | Norwood et al. .............. 385/17 |
| 2002/0131180 A1 | * | 9/2002 | Goodman | |

FOREIGN PATENT DOCUMENTS

EP 1 004 907 A2 5/2000 .............. 385/31 X

* cited by examiner

Primary Examiner—Brian Healy
(74) Attorney, Agent, or Firm—Finnegan, Henderson, Farabow, Garrett & Dunner, LLP

(57) ABSTRACT

A multiplexer/demultiplexer optical system component that is passively aligned upon assembly is disclosed. The optical system includes a lens block and a mirror-filter block. In some embodiments, optical filters are positioned and epoxyed to the mirror-filter block using a positioning tool. In some embodiments, optical filters are positioned and epoxyed on a support structure which has been etched to receive the optical filters. The mirror-filter block is a block having flat surfaces, one of which is a flat reflecting surface. The lens block is formed by injection molding and includes a barrel for holding and positioning an optical fiber, placement for a collimating lens, and placements for focusing lenses such that, when assembled, light incident on each of the focusing lenses propagates along the optical axis of the focusing lens. In some embodiments, the collimating lens and the focusing lenses are integrally formed with the lens block. In some embodiments, one or more of the collimating lens or focusing lenses are formed separately and inserted into holders integrally formed with the lens block to receive the lens. In some embodiments, the lens block includes a reflecting surfaces that directs light onto the focusing lenses. Assembly and alignment of the multiplexer/demultiplexer involves positioning a flat surface of the mirror-filter block against a receiving surface of the lens block with the filters between them and epoxying the components in place.

26 Claims, 16 Drawing Sheets

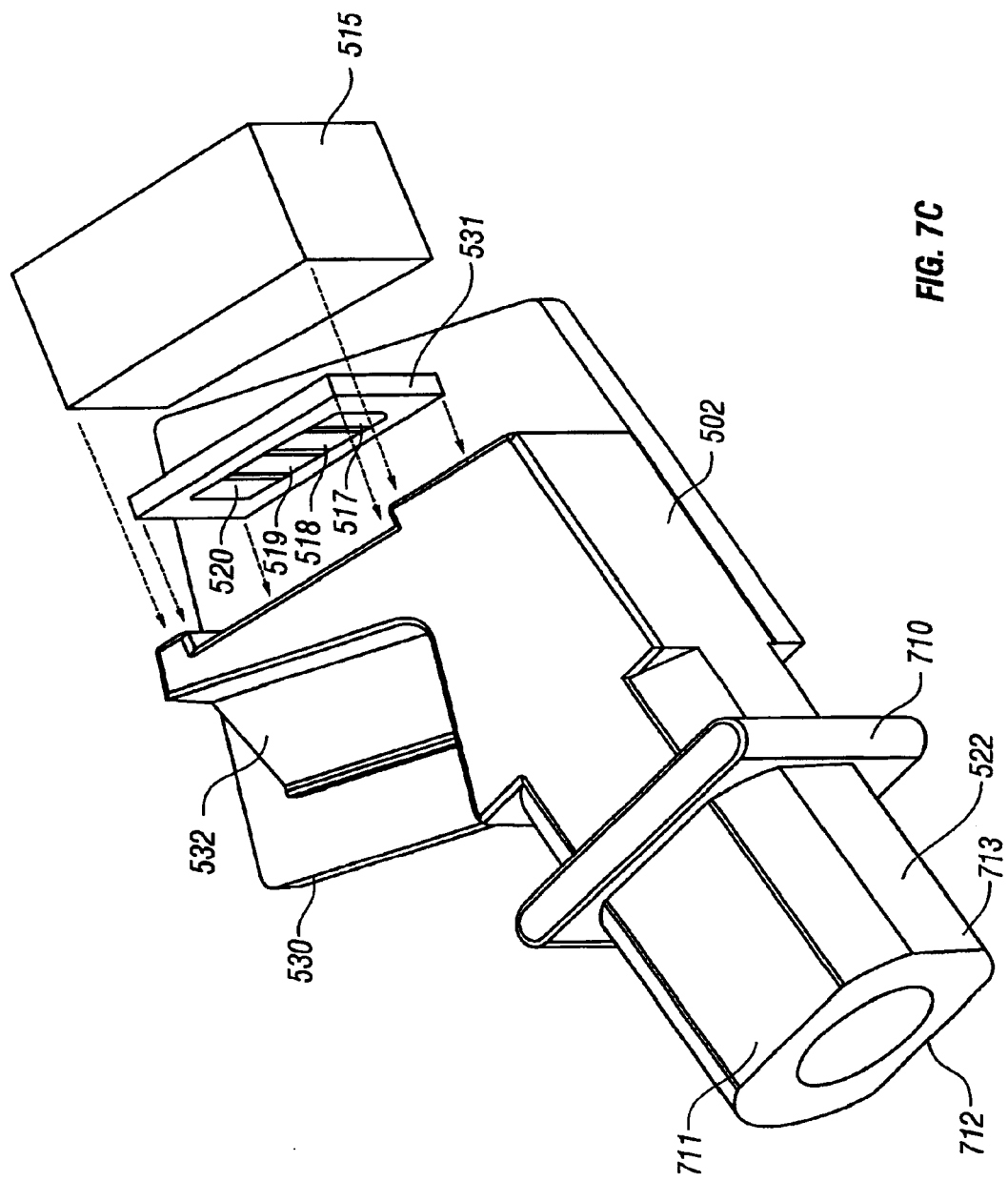

FILTER BASED MULTIPLEXER/DEMULTIPLEXER COMPONENT

BACKGROUND

1. Field of the Invention

The present invention relates to a multiplexer or demultiplexer optical component and, in particular, to a multiplexer or demultiplexer for a wavelength division multiplexed optical system.

2. Discussion of Related Art

Wavelength division multiplexing has become a standard in optical networks over the last few decades. Wavelength division multiplexing (WDM) exploits the potential bandwidth of optical fibers by transmitting data over several channels on the same fiber. Each channel is transmitted on the optical fiber at a different wavelength. The rate of data transmission over the fiber, then, can be increased by a factor of M, where M is the number of channels (i.e., the number of different wavelengths) being transmitted over the fiber.

Recently, an explosion of WDM technologies has appeared on the market. Systems having 8, 16, and 32 channels have become commonplace. Dense WDM, DWDM, for example, has 32 channels following an ITU grid with 0.8 nm wavelength separation. However, in order to effectively utilize the bandwidth of the optical fiber, optical signals must be multiplexed and demultiplexed onto the fiber.

In WDM systems, optical signals are transmitted over a set of M channels. The M channels are multiplexed at the transmitter so that M wavelengths of light are simultaneously transmitted on an optical fiber to a receiver system. At the receiver system, the M channels are demultiplexed into optical signals transmitted at individual wavelengths of light. The individual wavelengths of light can then be directed to photodetectors so that the optical signals can be converted into electrical signals for processing by subsequent electronic circuitry.

In some demultiplexing systems, an optical fiber can be directly attached to a dielectric waveguide. The waveguide geometry exploits interference and/or diffraction in order to separate different wavelength constituents of the input light beam. These systems are difficult to fabricate, have large insertion losses, and are only applicable to single-mode fibers.

Demultiplexing can be accomplished with diffraction gratings, prisms, or filters, for example. The major problem with such devices is that they often include bulky and costly lenses and such which are very hard to reliably align, leading to large manufacturing costs and a bulky final product.

FIG. 1A, for example, shows an embodiment of a filter-based demultiplexer as described in European Patent Application EP 1 004 907 A2 by Lemoff et al. The demultiplexer of FIG. 1A includes a main optical block 14, an input surface 38, an objective mirror 40, wavelength-specific dielectric interference filters 20, 22, 24 and 26 coupled to main optical block 14, and a series of relay mirrors 30, 32, and 36 integrated into main optical block 14 to direct and focus light onto filters 20, 22, 24, and 26. As can be seen, when properly aligned light from fiber 42 is reflected from objected mirror 40 onto filter 20. Light not passed by filter 20 is reflected to mirror 30, which focuses and reflects light onto filter 22. Light not passed by filter 22 is reflected to mirror 32, which focuses and reflects light onto filter 24. Light not passed by filter 24 is reflected to mirror 36, which focuses and reflects light onto filter 26. Light that passes through filters 20, 22, 24, and 26 is focused onto detectors 60, 62, 64, and 66, respectively, by lenses 50, 52, 54, and 56, respectively. However, the difficulty in assembling and aligning demultiplexer 10 is great, which increases the manufacturing cost because of time spent in active alignment of components. Additionally, light is not incident on detectors 60, 62, 64 and 66 normal to the detection surfaces, causing the lens assembly to be less tolerant to lateral misalignment of the detector. Finally, light is not incident on lenses 50, 52, 54, and 56 parallel to the optical axis of lenses 50, 52, 54, and 56 causing greater light spread through aberration and ultimately leading to a system that is less tolerant to lens misalignment.

FIG. 1B shows an embodiment of a demultiplexer as described in U.S. Pat. No. 5,894,535, issued on Apr. 13, 1999, to Lemoff et al. Light from filter 140 is coupled into waveguide 122 formed on substrate 121. A trench 125 is formed in substrate 121 and filters 127*a* through 127*d* are placed into trench 125 to intersect light transmitted by waveguide 122. Light transmitted through filters 127*a* through 127*d* are coupled into waveguides 126*a* through 126*d*, respectively. Light reflected from filters 127*a* through 127*c* is reflected back to filters 127*b* through 127*d*, respectively, by mirror 123. From waveguides 126*a* through 126*d*, light can be coupled to optical detectors or optical fiber. The demultiplexer shown in FIG. 1B requires processing of a silicon wafer to form waveguides 122, waveguides 126*a* through 126*d*, and trench 125. It is difficult to design the waveguide for both a multimode and single mode fiber input in such a way that the insertion losses in the waveguide are similar, due to the different input profiles that the waveguide has to accept in the case of multimode and single mode fiber. Additionally, aligning filters 127*a* through 127*d* with waveguides 122 and 126*a* through 126*d* and subsequent alignment of optical detectors with waveguides 126*a* through 126*d* would be difficult and time consuming, thus increasing the cost of production.

FIG. 1C shows yet another optical demultiplexer. In the optical demultiplexer of FIG. 1C, light from optical fiber 150 is transmitted, through lens 151, to filter 152. Filters 152, 158, 164, 155, and 161 transmit light in particular narrow bands and reflect light outside of that band. Light transmitted through filters 152, 158, 164, 155, and 161 are transmitted through lenses 153, 159, 165, 156, and 162, respectively, to optical detectors 154, 160, 166, 157, and 163, respectively. Light reflected from filters 152, 155, 158, and 161 are incident on filters 155, 158, 161, and 164, respectively. The optical demultiplexer of FIG. 1C requires significant time and effort to align, significantly increasing the cost of production of the optical device.

Therefore, there is a need for optical multiplexer and demultiplexer devices for WDM optical systems that are easily aligned and assembled and which result in low insertion loss.

SUMMARY

In accordance with the present invention, an optical multiplexer or demultiplexer system is disclosed which is significantly easier to assemble, requires little time in alignment, and reduces insertion loss. The system includes a pre-formed lens block arranged with a preformed mirror-filter block. The pre-formed mirror-filter block includes a flat mirror and accommodates an array of filters arranged so that light entering the mirror-filter block from the lens block is reflected between the array of filters and the flat mirror.

The lens block includes placement for a collimating lens and for a plurality of focusing lenses. In some embodiments, the lens block is formed by injection molding a transparent material having a particular index of refraction. In some embodiments, the lens block includes an integrally formed barrel for receiving, holding, and aligning an optical fiber.

In some embodiments, the collimating lens is positioned such that light transmitted into the lens block from the optical fiber is collimated and light transmitted into the optical fiber from the lens block is focused on the optical fiber. In some embodiments, the collimating lens simply couples light from the optical fiber into the lens block or couples light from the lens block into the optical fiber. In some embodiments, the collimating lens is integrally formed with the lens block. In some embodiments, the collimating lens, which for example, can be a conventional lens or a GRIN lens, is formed separately and positioned in a lens holder integrally formed in the lens block. In some embodiments, the collimating lens is formed on a separate post which receives the barrel. In some embodiments, the post is integrally formed with the lens block and in some embodiments the post can be separately formed and is slidably attached to the lens block.

Each lens of the array of focusing lenses is position to focus light from an array of optical filters positioned between the mirror-filter block and the lens block onto one of an array of optical devices. The optical devices can be optical detectors, optical fibers, or optical sources. If the optical devices are optical sources, then each of the array of focusing lenses collimates the light from the optical sources. In some embodiments of the invention, each focusing lens of the array of focusing lenses is integrally formed with the lens block. In some embodiments, each focusing lens, which, for example, can be a conventional lens or a GRIN lens, is separately formed and positioned within lens holders integrally formed with the lens block. In some embodiments each of the array of focusing lenses is an aspherical lens positioned such that light propagating between one of the array of filters and the focusing lens propagates parallel to the optical axis of the focusing lens.

The mirror-filter block can be formed by injection molding or can be formed by cutting and appropriately polishing a block of, for example, glass. Mirror-filter block, includes two parallel flat surfaces, one of which is a reflecting surface. The opposite flat surface is positioned against the lens block in alignment with the collimating lens and the array of focusing lenses. The mirror-filter block may include other flat surfaces, some of which are formed to align the mirror-filter block relative to the lens block. The reflecting surface may be mirrored, e.g., by depositing a thin metallic layer on the surface. In some embodiments, the array of filters can be positioned and fixed to the nonreflecting surface of the mirror-filter block, for example, with a positioning tool. In some embodiments, the array of filters are mounted on a support, which is placed between the mirror-filter block and the lens block during assembly. In some embodiments, the mirror-filter block, the lens block, and the filters are epoxied together with an index-matching epoxy.

In some embodiments, the lens block includes a reflecting surface to direct light between the optical filters and the focusing lenses. In some embodiments, the lens block includes one or more reflecting surfaces to direct light between the optical fiber and the mirror-filter block. In some embodiments, the reflecting surfaces of the lens block rely on total internal reflection while in other embodiments, the reflecting surfaces of the lens block may be mirrored to reduce optical losses.

Further, in some embodiments, the optical surface of the lens block, the optical filters, and the mirror-filter block can be coated with optical films in order to reduce scatter and loss of optical signal.

An optical multiplexer/demultiplexer component according to the present invention is passively aligned when assembled. Production of the component includes producing a lens block by, for example, injection molding of a transparent material; producing a mirror-filter block by, for example, cutting the block, polishing two opposing surfaces, and mirroring one of the two opposing surfaces, preparing the optical filters by, for example, positioning and fixing the filter to the unmirrored opposing surface of the lens block; and placing and fixing the mirror-filter block against the lens block by positioning the unmirrored opposing surface relative to corresponding surfaces of the lens block.

These and other embodiments are further described below along with the following Figures.

BRIEF DESCRIPTION OF THE FIGURES

FIGS. 7A through 7D show another embodiment of a multiplexer/demultiplexer component according to the present invention.

In the figures, elements having the same designation in different figures have the same functionality.

DETAILED DESCRIPTION

Figure 1A:
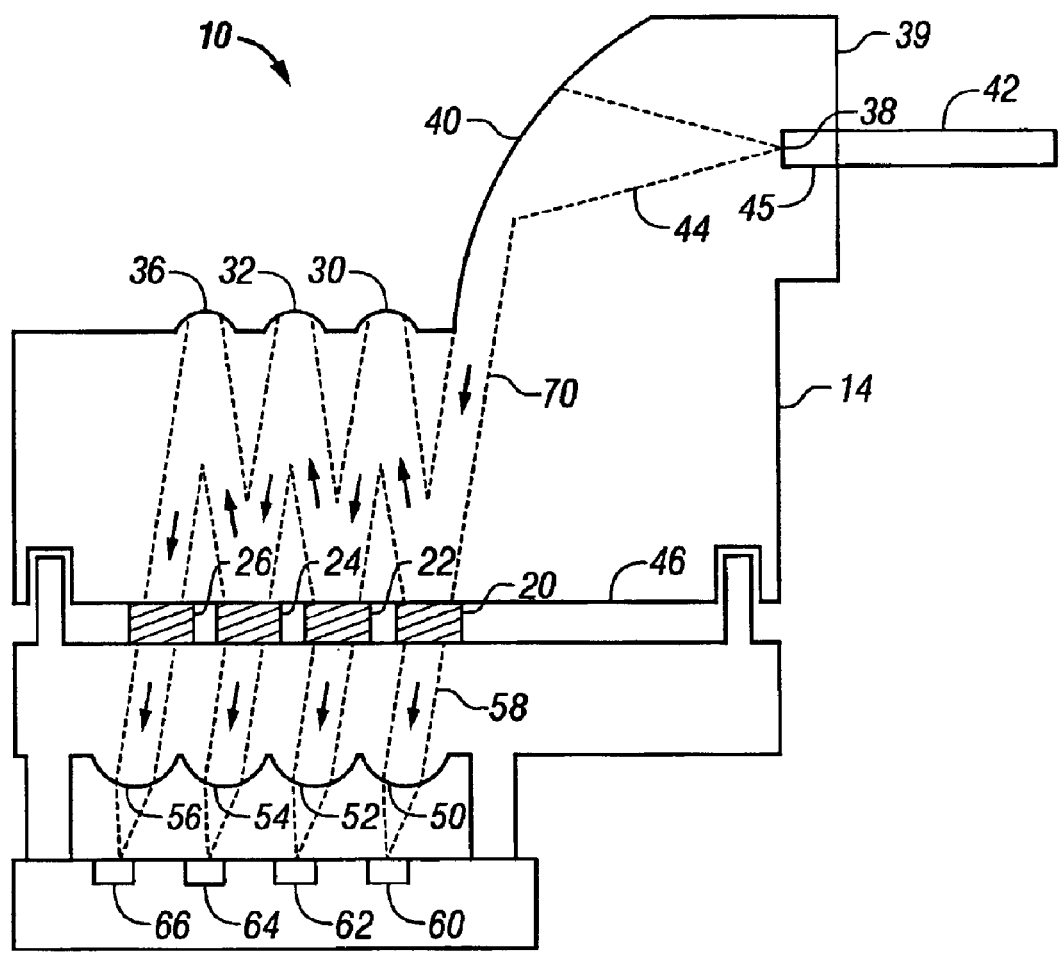
FIGS. 1A, 1B, and 1C show embodiments of demultiplexers according to the prior art.
Figure 1B:
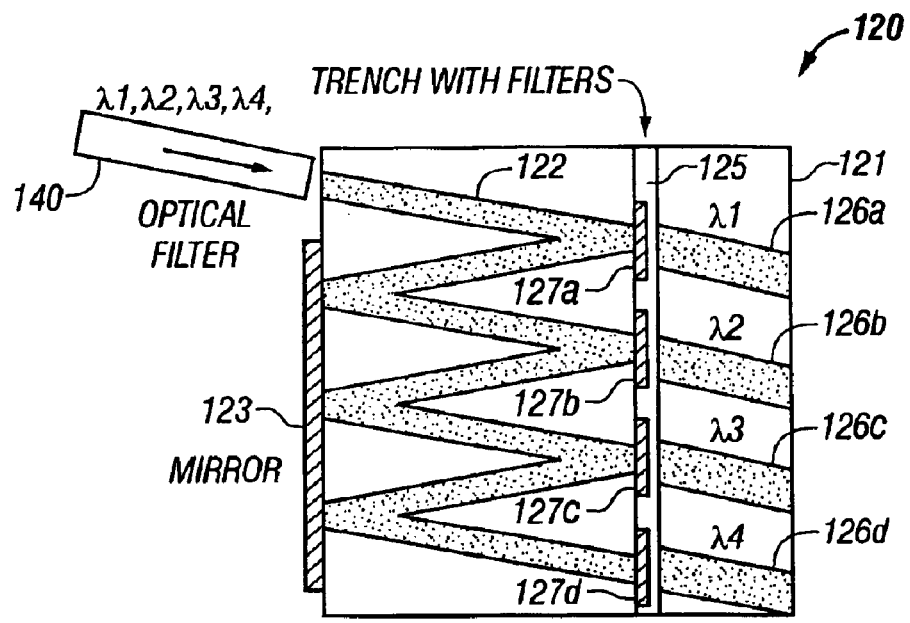
Figure 1C:
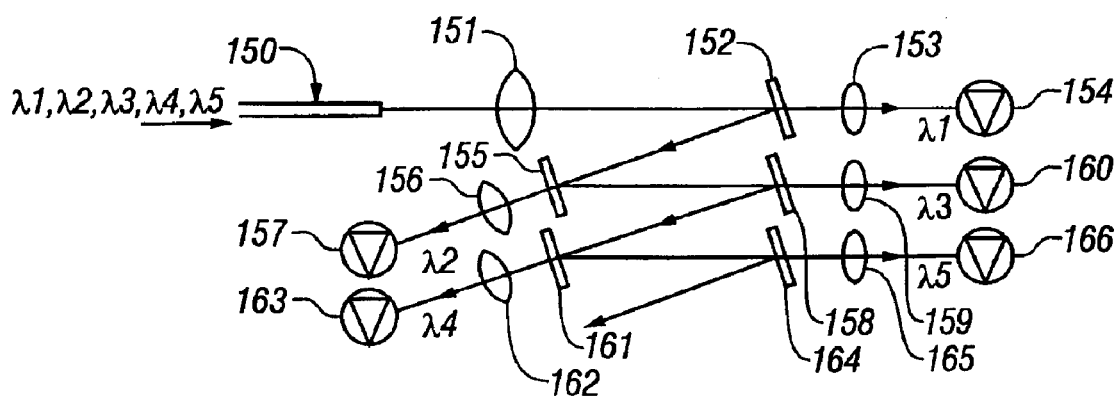
Figure 2A:
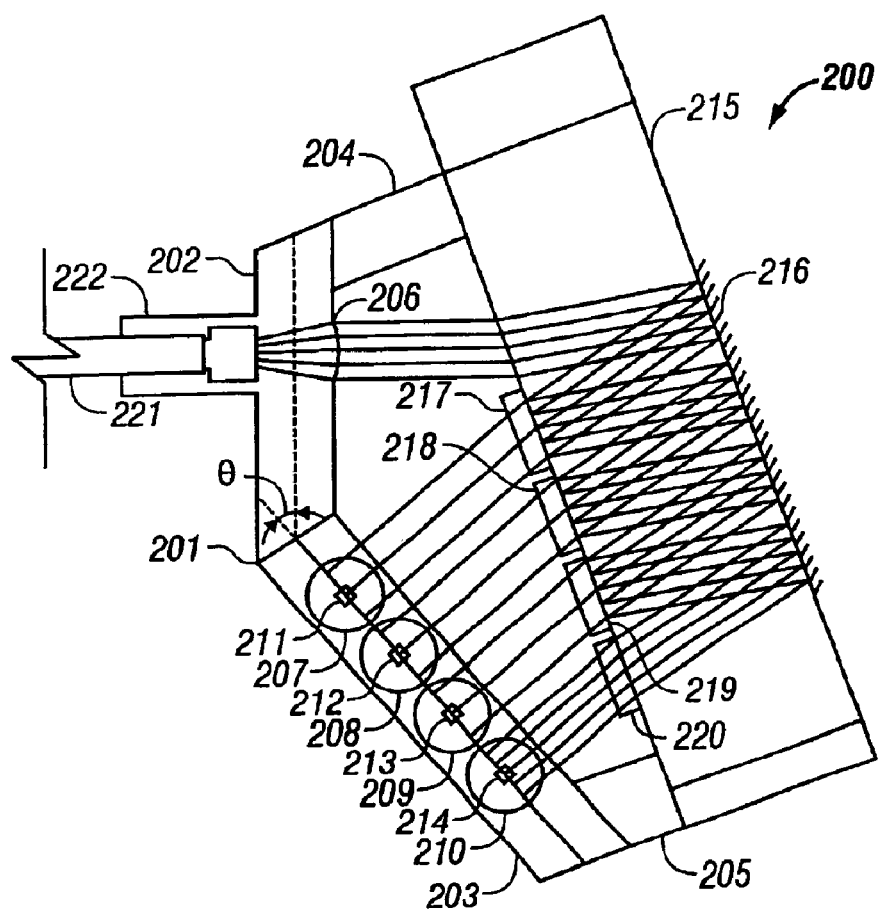
FIGS. 2A, 2B, and 2C show diagrams of an embodiments of a multiplexer/demultiplexer component according to the present invention.

FIG. 2A shows a component 200 according to the present invention. Component 200 can be a multiplexer or a demultiplexer and includes a lens block 201 and a mirror-filter block 215. Each of lens block 201 and mirror-filter block 215 can be molded as a separate piece or, alternatively, lens block 201 and mirror-filter block 215 can be molded as a single piece. The only alignment required at assembly is the relative alignment between lens block 201 and mirror-filter block 215 and the placement of optical filters 217 through 220 and optical devices 211 through 214.

Lens block 201 includes a collimating portion 202 and a lens-array portion 203 formed from a material that is transparent at the wavelengths of light transmitted on optical fiber 221. Collimating portion 202 includes placement for a collimating lens 206 so that light transmitted from optical fiber 221 is collimated, if component 200 is a demultiplexer. Collimating lens 206 couples light between optical fiber 221 and lens block 201. Lens block 201 further includes tabs 204 and 205 against which mirror-filter block 215 is positioned and which separate lens block 202 from mirror-filter block 215.

Figure 2B:
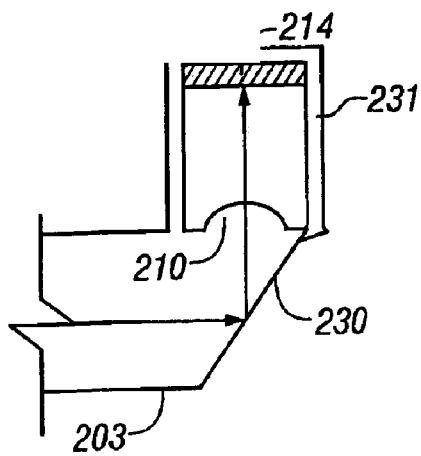
Figure 2C:
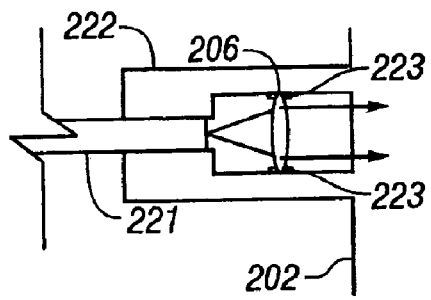

In some embodiments, fiber 221 is received in a barrel 222. Barrel 222 holds fiber 221 and aligns the light beam from fiber 221 with the optical system of demultiplexer 200. In some embodiments, collimating lens 206 is formed integrally with lens block 201. Collimating lens 206 can be integrally formed either facing fiber 221 within barrel 222 or on the opposite wall of collimator portion 202, as shown in FIG. 2A. Alternatively, collimating lens 206 can be formed separately from lens block 201 and positioned within lens block 202. In that case, barrel 222 aligns the collimating lens with fiber 221 in the optical system of demultiplexer 200. FIG. 2C shows an embodiment where collimator lens 206 is separately formed and mounted within a holder 223 integrally formed within lens block 202. Collimator lens 206, if separately formed, may be a conventional lens or may be a GRIN lens.

Collimator portion 202 and lens array portion 203 are formed at an angle θ with respect to one another so that light incident on lenses 207 through 210 from optical filters 217 through 220 is substantially parallel with the optical axis of lenses 207 through 210. Mirror-filter block 215 is a transparent block of material having flat edges for easy positioning against tabs 204 and 205 of lens block 201. A flat mirror 216 is formed on mirror-filter block 215 opposite the surface on which light is incident from lens block 201. In some embodiments of the invention, lens block 201 and mirror-filter block 215 can be formed as a single piece, removing the need to align these components at the time of assembly. In some embodiments, lenses 207 through 210 are aspherical lenses formed integrally with lens array portion 203. However, in some embodiments lenses 207 through 210 may be formed separately and placed into lens holders integrally formed in lens array portion 203.

If component 200 is a demultiplexer, light from optical fiber 221 is incident on collimator portion 202 of lens block 201 in such a way that a collimated beam of light substantially parallel with the optical axis of collimator lens 206 is created. The collimated beam of light is incident on mirror-filter block 215 at an incident angle such that light is reflected between flat mirror 216 and filters 217 through 220. Filters 217 through 220 each pass light within a narrow range of a central wavelength corresponding to one of the optical channels transmitted on optical fiber 221. Therefore, light passed by each of filters 217 through 220 corresponds with the optical data corresponding with one of the optical channels. Light reflected from filters 217 through 219 is reflected into filters 218 through 220, respectively, by flat mirror 216. Since there is a large tolerance in the actual position where the light beam exiting collimator filter 206 is incident on mirror-filter block 215, the alignment of lens array block 202 with mirror-filter block 215 is easily accomplished.

Filters 217 through 220 can be cut and positioned within predesignated areas on mirror-filter block 215. Alternatively, filters 217 through 220 can be mounted, for example by optical epoxy, to a support structure (not shown) and the support structure mounted, for example with optical epoxy, appropriately between mirror-filter block 215 and lens block 202.

The angle between collimator portion 202 and lens array portion 203, the angle θ, is arranged so that light passing through filters 217 through 220 is substantially directed along the optical axis of lenses 207 through 210, respectively. In some embodiments, as is shown in FIG. 2B, lens array portion 203 includes reflector 230 portion to reflect light passing through filters 217 through 220 into lenses 207 through 210, respectively. In some embodiments, lenses 207 through 210 are aspherical lenses. Lenses 207 through 210 focus light onto optical devices 211 through 214, respectively. FIG. 2B shows an embodiment where lens array portion 203 includes a reflecting surface 230 for diverting the light beam from, for example, optical filter 220 into lens 210.

Optical devices 211 through 214 can be any optical detector, including GaAs, Si or InGaAs based photodetectors in either discrete or array form, optical fibers coupled to receive light corresponding to individual channels, or optical sources if component 200 is a multiplexer. Optical sources can include photodiodes, vertical cavity side emission lasers (VCSELS), or light carrying optical fiber.

Component 200 can be assembled by positioning lens block 201, with integrally formed barrel 222, relative to mirror-filter block 215. Lens block 201 may be fixed to mirror-filter block 215 by, for example, an index-matching epoxy or fluid. Alternatively, lens block 201 can be integrally formed with mirror block 215. Optical fiber 221 can then be positioned and fixed, for example with epoxy, into barrel 222. If lens 206 is separately formed, lens 206 can then be positioned and fixed within barrel 222, for example by inserting it into a preformed holder in barrel 222. In some embodiments, barrel 222 can then be sealed by securing a covering over barrel 222.

Filters 217 through 220 can then be positioned and fixed in place on mirror-filter block 216. In some embodiments, filters 217 through 220 can be individually placed and fixed, for example, with optically transparent epoxy. Additionally, lens block 202 and mirror-filter block 215 may include locators or guides to assist in positioning the two pieces relative to one another. In other embodiments, filters 217 through 220 can be fixed separately to a support and then the support fixed to mirror-filter block 215 with, for example, an epoxy. In embodiments where lenses 207 through 210 are not integrally formed with lens array block 203, then lenses 207 through 210 can be inserted into lens holders that are integrally formed with lens array block 203. Optical devices 211 through 214 can then be positioned at or near the focal points of lenses 207 through 210, respectively, to receive the light from lenses 207 through 210.

In some embodiments, as shown in FIG. 2B, lens array block 203 includes a reflecting surface 230 that directs light along the optical axis of lens 220. In some embodiments of the invention, optical detectors 211 through 214 can be inserted into a holder 231 integrally formed with lens array block 203. Holder 231 can be formed to include depressions for receiving optical devices 214.

Therefore, throughout the assembly process of component 200, only passive alignment processes are used. All components of lens block 202 are aligned through the injection molding processes with elements not formed by injection molding easily insertable into pre-formed holders in the injection molded portions or easily positioned on the surfaces of lens block 202 or mirror-filtered block 215.

One skilled in the art will recognize that, although four (4) filters are shown in FIG. 2A, component 200 can include any number of filters in order to provide demultiplexing of the light from optical fiber 221 into any number of individual channels or to multiplex any number of channels onto optical fiber 221.

Figure 3A:
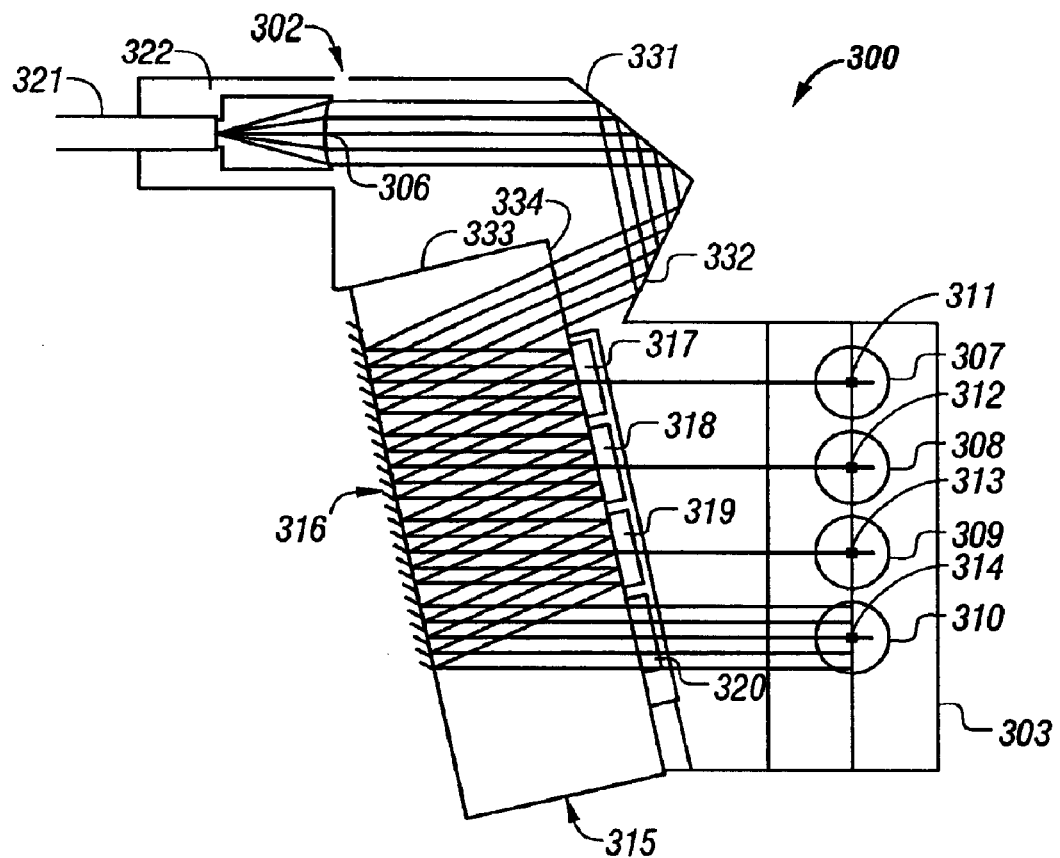
FIGS. 3A, 3B, and 3C show diagrams of another embodiment of a multiplexer/demultiplexer component according to the present invention.

FIG. 3A shows another component 300 according to the present invention. Component 300 includes a lens block 302 and a mirror-filter block 315. In some embodiments, lens block 302 and mirror-filter block 315 are separate pieces. Mirror-filter block 315 can be constructed with all flat surfaces so that it easily mates with, and is easily aligned with, lens block 302 as shown in FIG. 3A, mirror-filter block 315 is simply positioned and fixed against surfaces 333 and 334 of lens block 302. In FIG. 3A, lens block 302 includes surfaces 333 and 334 which provide guidance for the accurate alignment of mirror-filter block 315 and lens block 302. In some embodiments, lens block 302 and mirror-filter block 315 can be integrally molded in one piece.

If optical component 300 is part of a demultiplexer, light from optical fiber 321 enters collimator block 302 and is collimated by collimator lens 306. Optical fiber 321 is mechanically received and fixed into barrel 322, which can be integrally formed with lens block 302. In some embodiments, as shown in FIG. 3C, lens 306 is separately formed and fixed within barrel 322. Barrel 322, in some embodiments, can have a holder 323 for receiving lens 306. As has been previously discussed, lens 306 can be a conventional lens or can be a GRIN lens.

In this embodiment, light is reflected into mirror block 315 by reflecting surfaces 331 and 332. In some embodiments, surfaces 331 and 332 are at right angles to each other and the reflection at surfaces 331 and 332 is accomplished by a total internal reflection. In other embodiments, surfaces 331 and 332 can be at any angle relative to one another and each of surfaces 331 and 332 may be mirrored in order to reduce optical losses. Light enters mirror block 315 at an angle such that it is reflected from flat mirror 316 and onto filter 317. Filter 317 passes light in a narrow wavelength range centered about one of the wavelengths corresponding to a channel transmitted on fiber 321. Light that is not passed by filter 317 is reflected by mirror 316 into filter 318. Filter 318 passes light in a narrow wavelength range centered about another wavelength corresponding to a second channel of information on fiber 321. Again, light not passed by filter 318 is reflected into filter 319 by mirror 316 and light not passed by filter 319 is reflected into filter 320 by mirror 316. Filters 319 and 320 both pass light within a narrow range around a wavelength corresponding to a third and fourth channel, respectively, carried on fiber 321. In general, component 300 can include any number of filters, corresponding to any number of channels corresponding with any number of wavelengths of light transmitted on fiber 321.

Light transmitted through filters 317, 318, 319 and 320 are substantially normally incident on lenses 307, 308, 309, and 310, respectively. Lenses 307, 308, 309, and 310 focus the light from filters 317, 318, 319, and 320, respectively, onto device detectors 311, 312, 313, and 314, respectively. One skilled in the art will recognize that, although FIG. 3A shows an optical diagram of a demultiplexer 300, demultiplexer 300 can be utilized as a multiplexer if optical devices 311, 312, 313, and 314 are light sources. Examples of optical devices are discussed above with respect to optical devices 211 through 214 of FIG. 2A.

Figure 3B:
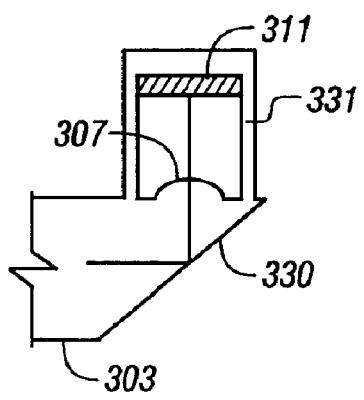
Figure 3C:
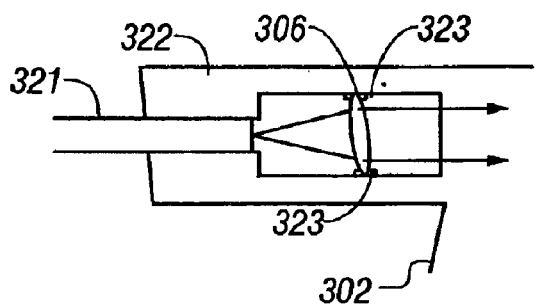

FIG. 3B shows an embodiment of lens array 303. Lens array 303 includes lens 307, 308, 309, and 310, as described above. The embodiment shown in FIG. 3B, however, includes a reflection surface 330 so that light from filters 317, 318, 319 and 320 are reflected into lenses 307, 308, 309, and 310, respectively, which focuses light onto devices 311, 312, 313, and 314, respectively. In some embodiments, reflection surface 330 relies on total internal reflection and in some embodiments reflection surface 330 can be mirrored (e.g., by coating with a highly reflective material or film). In some embodiments, optical devices 311, 312, 313 and 314 can be positioned within formed positioners in holder 331.

In some embodiments, lens block 302 and mirror block 315, can be formed separately of a material transparent to the wavelengths of light transmitted by fiber 321. Collimator block 306, mirror block 315, and lens array block 303 are then aligned when positioned together. In some embodiments, lens block 303 and mirror block 315 are molded as one piece of a material transparent to the wavelengths of light transmitted by fiber 321. In these latter embodiments, component 300 is completed by simply adding filters 317, 318, 319 and 320 and by adding devices 311, 312, 313 and 314.

Figure 4A:
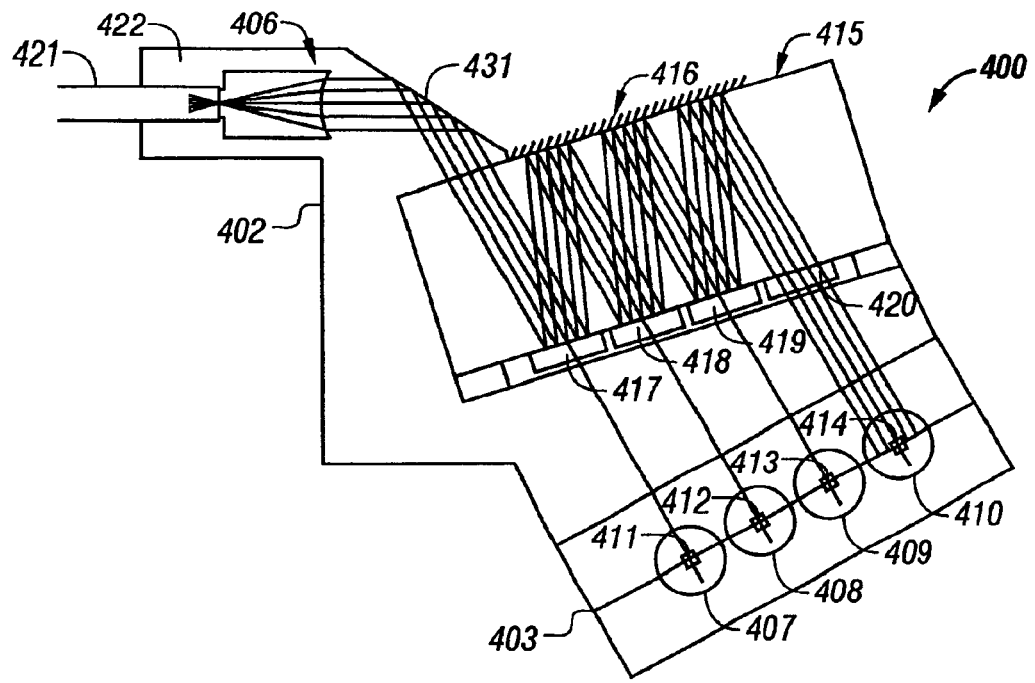
FIGS. 4A, 4B, and 4C show diagrams of yet other embodiments of a multiplexer/demultiplexer component according to the present invention.

FIG. 4A shows another embodiment of an optical component 400 according to the present invention. Again, fiber 421 transports a light beam having a number of channels of separate optical signals. Each channel is transmitted on a light beam having a specific wavelength. If optical component 400 is a demultiplexer, then the light beam from fiber 421 is incident on collimator block 402 and collimated by collimation lens 406. As shown in FIG. 4C, in some embodiments collimating lens 306 is a separately formed lens such as a conventional or GRIN lens mounted in holder 423 of lens block 402. The light beam from lens 406 is reflected into mirror block 415 by reflection surface 431. Again, reflection surface 431 can rely on total internal reflection or can be mirrored. In mirror block 415, light from reflection surface 431 is first incident on filter 417. Light not passed by filter 417 is reflected to filter 418 by mirror 416, light not passed by filter 418 is reflected to mirror 419 by mirror 416, and light not passed by filter 419 is reflected to mirror 420 by mirror 416. Each of filters 417, 418, 419 and 420 pass light in a narrow range around a center wavelength corresponding to one of the wavelengths of light transmitted on optical fiber 421. Light transmitted through filters 417, 418, 419, and 420 is normally incident on lenses 407, 408, 409, and 410, respectively, in lens array block 403. Lenses 407, 408, 409, and 410 focus the light transmitted through filters 417, 418, 419, and 420, respectively, onto optical detectors 411, 412, 413, and 414, respectively.

One skilled in the art will recognize that, although four filters, filters 417, 418, 419, and 420, are shown in FIG. 4A, embodiments of demultiplexer 400 according to the present invention can include any number of filters for separating the light beam transmitted on fiber 421 into any number of different wavelengths. The light transmitted through each filter is focussed onto an optical device 411 through 414 so that a separate electrical signal can be derived from each of the set of preselected wavelengths transmitted on fiber 421. One skilled in the art will also recognize that demultiplexer 400 can operate as a multiplexer if devices 411, 412, 413, and 414 are optical sources as has been previously discussed.

Again, in some embodiments lens block 402 and mirror-filter block 415 can be separately formed of transparent materials. Optical alignment of component 400 is accomplished when lens block 402 and mirror-filter block 415 are positioned relative to one another. In some embodiments, lens block 402 and mirror block 415 are molded as a single piece of a transparent material. In that case, the optical alignment of component 400 is accomplished when demultiplexer 400 is molded.

Figure 4B:
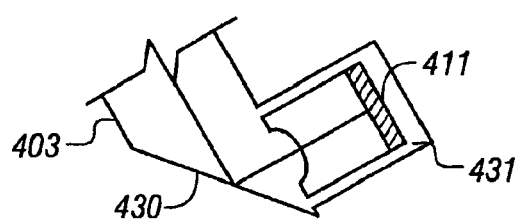
Figure 4C:
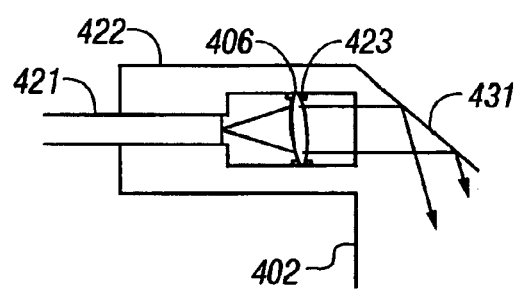

FIG. 4B shows a cross-sectional view of one embodiment of optical lens array 403. Optical lens array 403 includes a reflecting surface 430 which directs light from each of filters 417, 418, 419 and 420 into lenses 407, 408, 409 and 410, respectively. In some embodiments, reflecting surface 430 relies on total internal reflection. In some embodiments, reflecting surface 430 may be a mirrored surface in order to reduce signal loss.

Figure 5A:
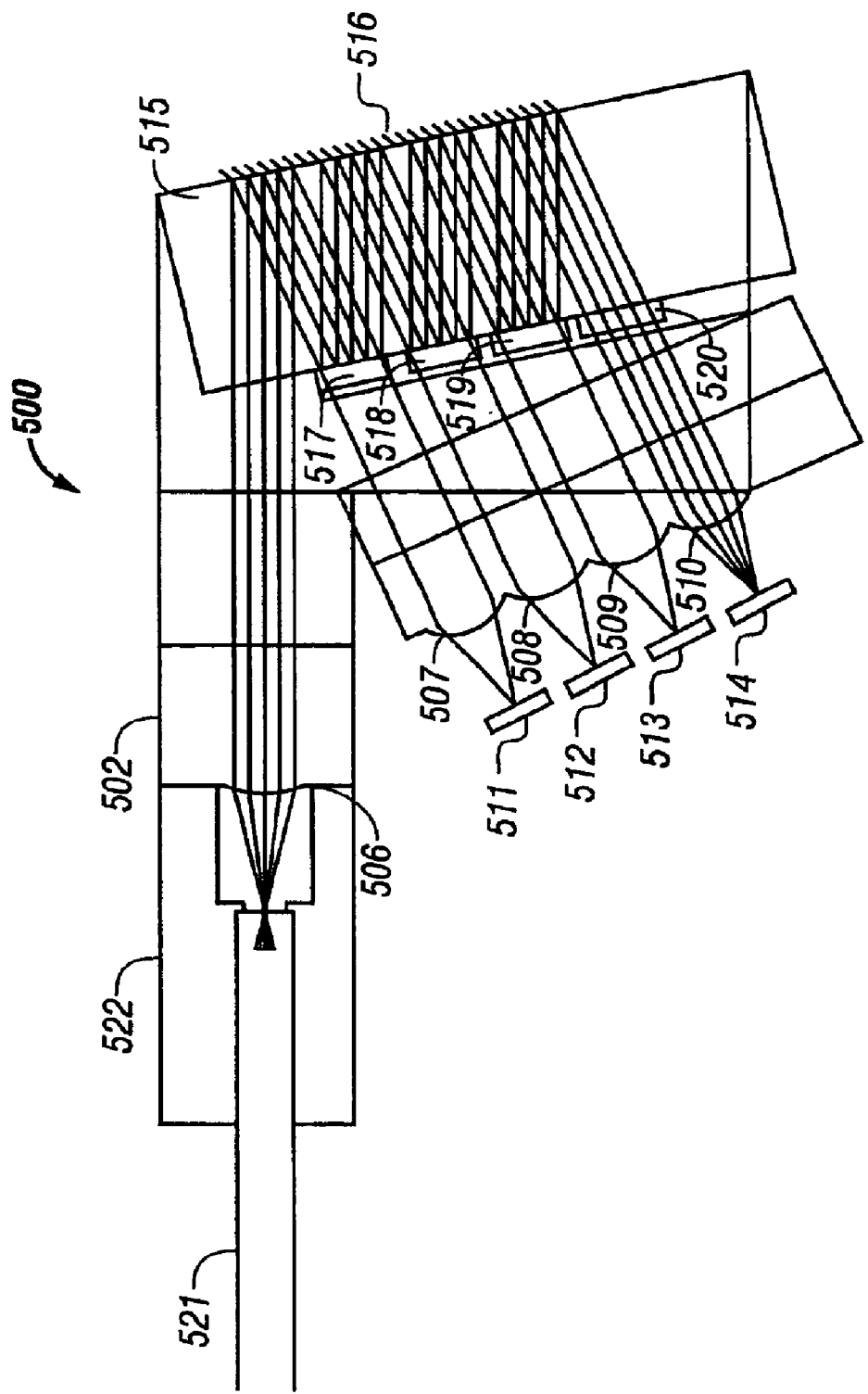
FIGS. 5A through 5R show detailed diagrams of a multiplexer/demultiplexer component according to the present invention.

FIG. 5A shows an optical diagram for an embodiment of a component 500 according to the present invention. Optical fiber 521 is inserted into barrel 522 which is integrally formed with lens block 502. In the embodiment shown in FIG. 5A, collimating lens 506 is integrally formed with lens block 502 however in some embodiments collimating lens 506 may be a separately formed lens such as a conventional or GRIN lens which is inserted into a holder integrally formed in barrel 522. If component 500 is a demultiplexer, collimated light passes through lens block 502 collimated by collimating lens 506 and into mirror-filter block 515. In mirror-filter block 515, light is reflected in a zig-zag pattern between flat mirror 516 and filters 517, 518, 519 and 520. Each of filters 517, 518, 519 and 520 pass a narrow range of wavelengths centered around one of the wavelengths corresponding to a channel transmitted on optical fiber 521.

The wavelengths corresponding to the channels transmitted on optical fiber 521 are typically set by a standards body such as the International Transmission Union (ITU) or the Institute of Electrical and Electronic Engineers (IEEE). In some four-channel embodiments, for example, filters 517, 518, 519 and 520 pass light within about +/−5.5 nm of the central wavelengths of about 1275.7 nm, 1300.2 nm, 1324.7 nm, 1350.2 nm, respectively. One skilled in the art will recognize that embodiments of the invention can include any number of filters in order to separate the light from optical fiber 521 into any number of channels having any separable wavelengths. For example, some embodiments may include filters centered on the wavelengths 778, 789, 801, 813, 825, 838, 951, and 865nm.

In FIG. 5A, light that is passed by filters 517, 518, 519, and 520 is substantially axially incident on lenses 507, 508, 509 and 510, respectively. Lenses 507, 508, 509 and 510 focus light onto devices 511, 512, 513, and 514, respectively. One skilled in the art will recognize that component 500 can function as a multiplexer if devices 511, 512, 513, and 514 are controllable optical sources that convert electrical signals into optical signals.

If component 500 is a demultiplexer, then devices 511 through 514 are optical detectors or optical fiber. An optical detector is any device which converts optical signals to electrical signals, including, for example, p-I-n photodetectors and avalanche photodiodes. If component 500 is a multiplexer, then devices 511 through 514 are optical fibers or optical sources. An optical source is any device which converts electrical signals to optical signals, including, for example, fabry-perot lasers, distributed feedback lasers and vertical cavity surface emitting lasers (VCSELs).

Figure 5B:
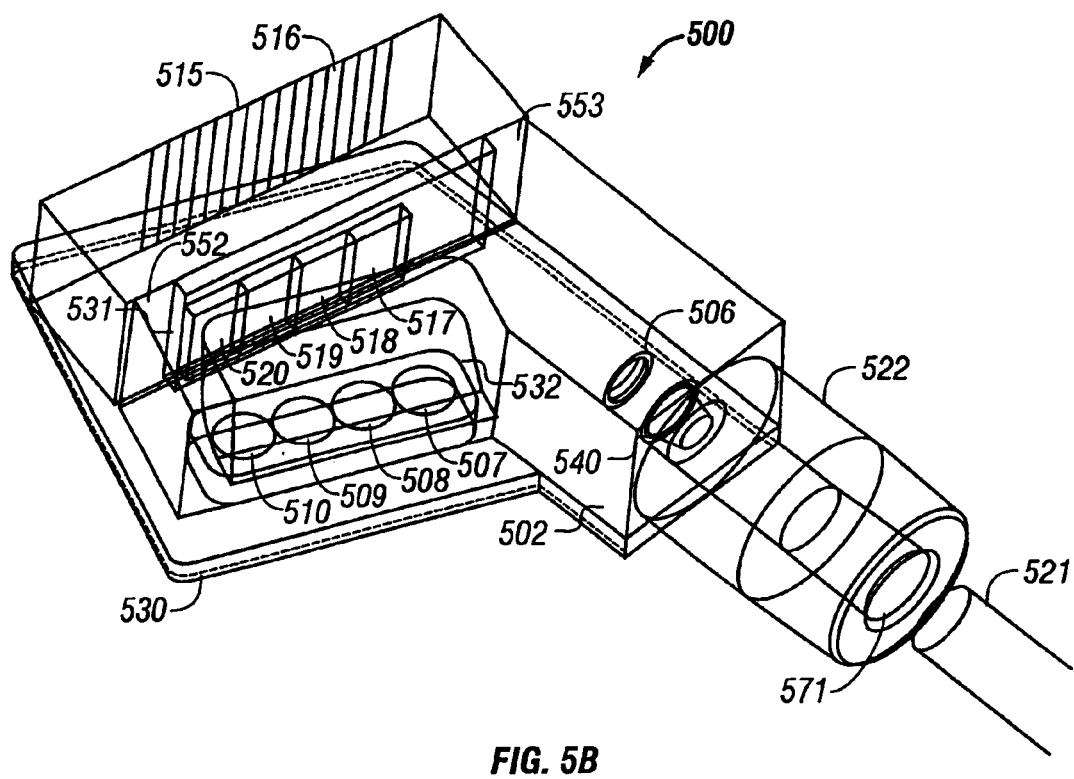

FIG. 5B shows a transparent three-dimensional drawing of an embodiment of component 500. In the embodiment of component 500 shown in FIG. 5B, filters 517, 518, 519, and 520 are positioned on a support structure 531 which is inserted in a gap formed between mirror-filter block 515 and lens block 502 by tabs 552 and 553 integrally formed in lens block 502. Alternatively, filters 517, 518, 519, and 520 are fixed to mirror-filter block 515. Additionally, lens block 502, mirror-filter block 515, and support 531 are positioned on and fixed to a base 530. When assembled, lens block 502 and mirror-filter block 515 can be epoxied to base 530.

As shown in FIG. 5B, component 500 includes a reflecting surface 532 that reflects the light passed by filters 517, 518, 519, and 520 onto lenses 507, 508, 509 and 510, respectively. Lenses 507, 508, 509, and 510 can be aspherical focusing lenses integrally formed with lens block 502. Component 500 of FIG. 5B includes a barrel 522 that receives and firmly holds optical fiber 521. In FIG. 5B, barrel 522 is integrally formed with lens block 502. Barrel 522 includes a stop 540 which determines when optical fiber 521 is fully inserted into lens body 502. In some embodiments, optical fiber 521 can be epoxied into barrel 522. Collimating lens 506, in FIG. 5B, is integrally formed with lens block 502 and is an aspherical lens axially aligned with the optical axis of inserted optical fiber 521. If component 500 is a demultiplexer, collimating lens 506 collimates the light emitted from optical fiber 521. If component 500 is a multiplexer, collimating lens 506 focuses light onto optical fiber 521.

Figure 5C:
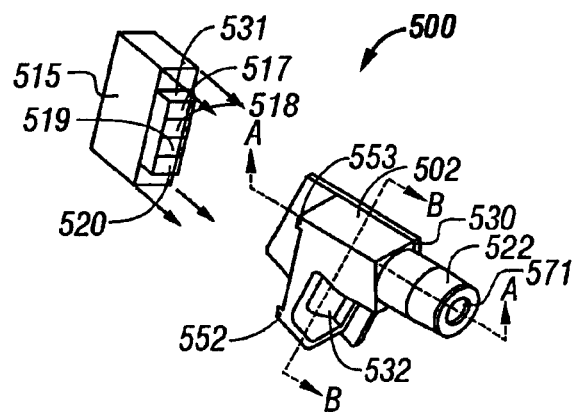

FIG. 5C shows component 500 of FIG. 5B in solid form. Additionally, mirror-filter block 515 and filter support 531 are shown separated from lens block 502, which is shown already fixed to base 530.

Figure 5D:
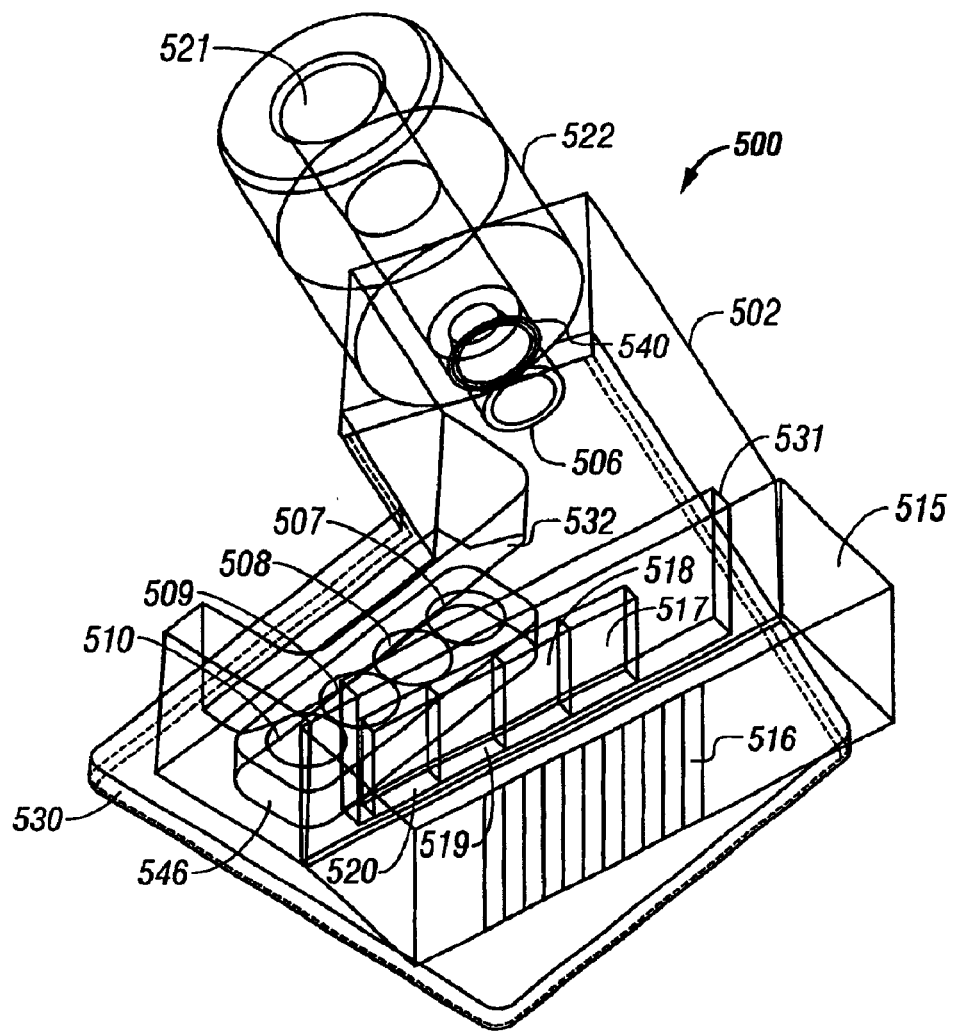
Figure 5E:
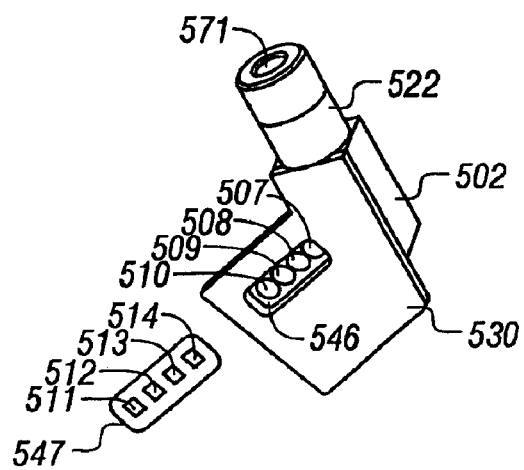

FIG. 5D shows a transparent view from the side of base 530 (i.e., the bottom) of component 500. Base 530 includes an access hole 546 which allows light access to light from lenses 507, 508, 509, and 510. FIG. 5E shows a solid view from the bottom of component 500. As shown in FIG. 5E, in some embodiments devices 511, 512, 513, and 514 are mounted on a device support 547 which is inserted and fixed within access 546 so that light from lenses 507, 508, 509, and 510 is incident on devices 511, 512, 513, and 514, respectively, if component 500 is a demultiplexer. If component 500 is a multiplexer, light from devices 511, 512, 513, and 514 is collimated by lenses 507, 508, 509, and 510, respectively.

FIGS. 5F through 5R illustrate in detail a particular embodiment of demultiplexer 500. Although specific dimensions are given, these dimension are exemplary only and should not be considered limiting. One skilled in the art will recognize that a demultiplexer or multiplexer component according to the present invention may have other physical dimensions than those described here.

Figure 5F:
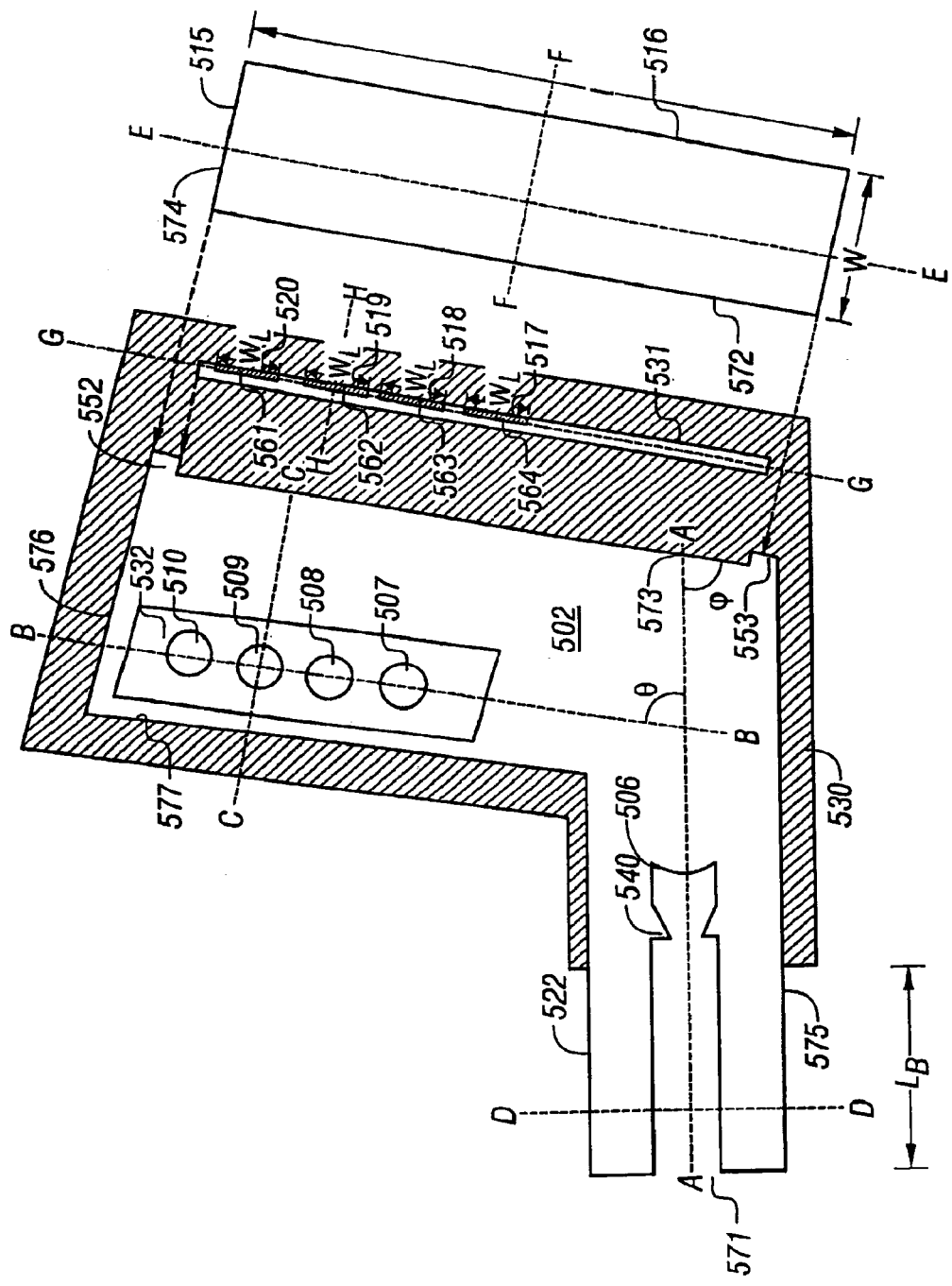

FIG. 5F shows a top plan view of component 500 with filter support 531 and mirror-filter block 515 separated from lens block 502. Lens block 502 is formed of a transparent material such as, for example, Ultem® or Lexan®, both made by General Electric Corporation which can be injection molded. Ultem® has a refractive index of about 1.637 at a wavelength of 1300 nm. Lexan® has a refractive index of about 1.60 at a wavelength of 1300 nm. Mirror-filter block 515 can be formed from glass. Lens block 502 is formed by injection molding of Ultem®, Lexan®, or some other transparent material. One skilled in the art will recognize that the relative angles of portions of demultiplexer 500 are dependent upon the indices of refraction of the materials utilized in manufacturing lens block 502, mirror-filter block 515, and filter support 531.

In some embodiments, mirror-filter block 515 is a glass block having an index of about 1.5 and filter support 531 is formed on a glass slide. Filter support 531, mirror-filter block 515, and lens block 502 can be attached with the use of an index matching epoxy such as Norland Optical Adhesive, produced by Norland Corporation. Mirror-filter block 515 can be formed by cutting and polishing a glass block and depositing, for example, Silver or Gold to form mirrored surface 516. Mirror-filter block 515 has a flat mirrored surface 516 and a flat polished surface 572 opposite mirrored surface 516. In some embodiments, other flat surfaces (e.g., a bottom surface to rest on base 530) are formed in order to align mirror-filter block 515 relative to lens block 502.

Filter support 531 can be a glass slide etched to receive individual filters 517 through 520. Filters 517 through 520 can be interference type filters such as multilayer dielectric coatings of controlled thicknesses involving alternating high and low refractive index layers of, for example, Silicon dioxide and Tantalum oxide, which are cut and inserted into receiving depressions 561, 562, 563, and 564 formed in filter support 531. Filters 517 through 520 include filters that pass the wavelengths corresponding to the optical channels of the multiplexer. For example, filters 517 through 520 can be filters that pass wavelengths of about 1275.7 nm, about 1300.2 nm, about 1324.7 nm, and about 1350.2 nm, respectively, with about a 1 dB passband of bandwidth of about 11 nm while reflecting other wavelengths in the range of valid wavelengths corresponding to channels transmitted on optical fiber 521. Other relevant wavelength ranges include other ITU wavelength grids, such as those including the 820 nm to 880 nm range typical VCSEL light sources.

In some embodiments, lens block 502 is formed by injection molding of Ultem®, filter support 531 is formed from a glass slide having index of about 1.63, and mirror-filter block 515 is formed by polishing and silvering a glass block having index of about 1.63, which matches the index of Ultem®. In some embodiments, barrel 522 of lens block 502, $L_B$, can be about 5 mm long. Barrel 522 can either be molded on the lens block 502 or molded as a separate piece and attached to the lens block. If it is molded as a separate piece, then the lens block will have a post on which the collimating front lens sits. The barrel is, then, slidably attached to the post. In some embodiments, the post is integrally formed with lens block 502 and in other embodiments the post can be separately formed and is slidably attached to lens block 502.

Figure 6:
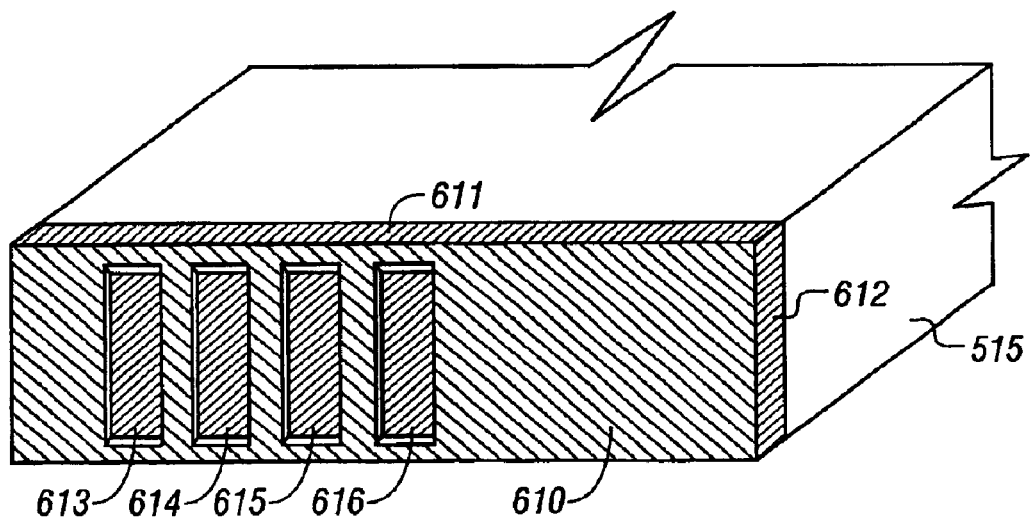
FIG. 6 shows an embodiment of a positioning tool for fixing optical filters to the mirror-filter block according to some embodiments of a component according to the present invention.

In some embodiments, access 571 for receiving an optical fiber (fiber 521 in FIG. 5A) in barrel 522 has a depth of about 4 mm before encountering fiber stop 540. The end of an inserted fiber, which is flush with fiber stop 540, can then be separated by a distance of about 1 mm from the vertex of lens 506. Lens 506, which can be integrally formed with lens block 502, can be an aspherical lens that is axially symmetric along line A—A with an inserted optical fiber. Lens 506 can be described by its radius of curvature, which can be between about 500 and about 900 microns, and its conic constants, which can be between about −2 and about −3. Light from lens 506, then, travels a further distance of about 6.5 mm along axial axis A—A before being incident on surface 573. Surface 573 makes an angle φ of about 78 degrees with axis A—A such that the incident angle of light traveling along axis A—A with surface 573 is 90-φ. When assembled, surface 572 of mirror-filter block 515 is parallel with surface 573 of lens block 502. Tabs 552 and 553 hold surface 572 away from surface 573 by a separation distance, in some embodiments, of about 0.5 mm, which substantially corresponds to the thickness of support 531. Support 531, then, can be coated with index matching epoxies and inserted between surfaces 572 and 573. Alternatively, filters 517, 518, 519, and 520 can be positioned and attached directly to mirror-filter 515 and the gap between surfaces 572 and 573 can be filled with an index matching epoxy. In some embodiments, filters 517, 518, 519, and 520 can be positioned and epoxied to mirror-filter block 515 using a positioning tool, as is shown in FIG. 6.

In some embodiments, mirror-filter block 515 has a width W of about 6.5 mm and a length L of about 2.5 mm. Filters 517, 518, 519, and 520 can have a width $W_F$ of about 1 mm and a pitch (i.e., the distance between filter centers) of about 1 mm. Filter support 531, then, is formed of an index matching epoxy inserted into the gap between surfaces 573 and 572 after mirror-filter block 515 is positioned against tabs 552 and 553 of lens block 502. In some embodiments, filters 517, 518, 519, and 520 (having the above widths and positioned with the pitch described above) are positioned on support 531 which is later inserted into the gap between 573 and 572.

Lenses 507, 508, 509 and 510 are positioned with centers along axis B—B. In some embodiments, axis B—B makes an angle θ of about 66 degrees with respect to axis A—A and intersects axis A—A at a distance of about 5 mm from the end of an inserted optical fiber (i.e., from fiber stop 540). Lenses 507, 508, 509 and 510 are positioned so that light from filters 517, 518, 519, and 520, respectively, is substantially axially incident on lenses 507, 508, 509, and 510, respectively. A reflecting surface 532 reflects light from lenses 507, 508, 509 and 510 onto lenses 517, 518, 519, and 520, respectively.

Figure 5G:
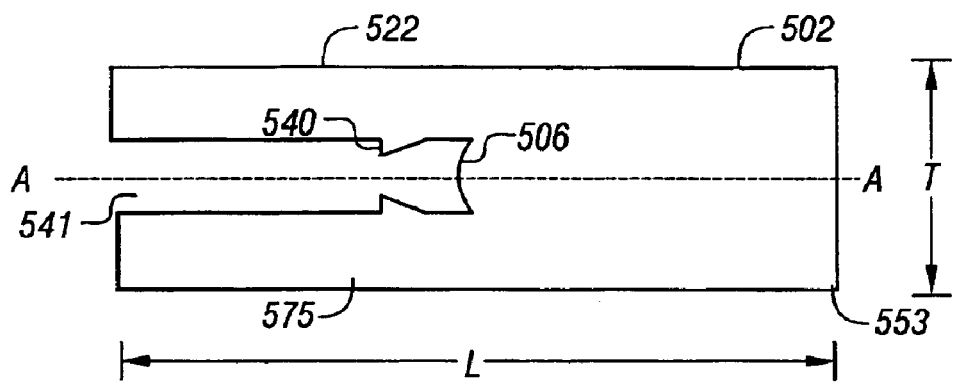

FIG. 5G shows a cross section of lens block 502 along axis A—A showing surface 575. In some embodiments, surface 575 has an overall length L (including tab 553) of about 7 mm and a thickness t of about 4 mm.

Figure 5H:
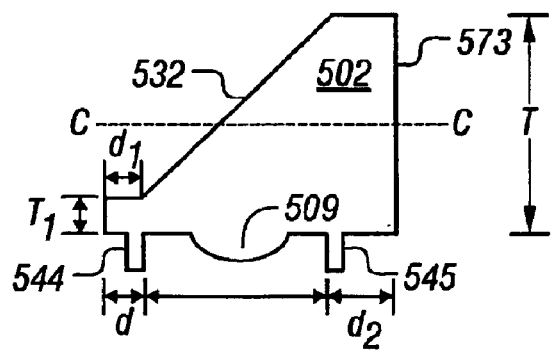

FIG. 5H shows a cross section of lens block 502 along axis C—C. Axis C—C is perpendicular to axis B—B and passes through the center of lens 509. As shown in FIG. 5H, reflecting surface 532 can be a 450 reflecting surface so that light entering from surface 573 parallel to axis C—C is reflected in a direction parallel with the optical axis of lens 509. The thickness t of lens block 502 along axis C—C at surface 573 is the same as the thickness shown in FIG. 5G. The distance to the start of reflecting surface 532, which in FIG. 5G is a 45° surface, along axis C—C is $d_1$, which in some embodiments can be about 0.3 mm. The distance from surface 573 to reflecting surface 532 is about 2.1 mm. In some embodiments, tabs 544 and 545 can guide lens block 530 into access 546 of base 530 and protects lens 509. Each of lenses 507, 508, 509, and 510 are aspherical lenses described by the radius of curvature, which can be about 500–800 microns, and conic constant, which can be about 2.5, and are integrally formed with lens block 502. Tabs 544 and 545 are separated by about 4 mm.

Figure 5I:
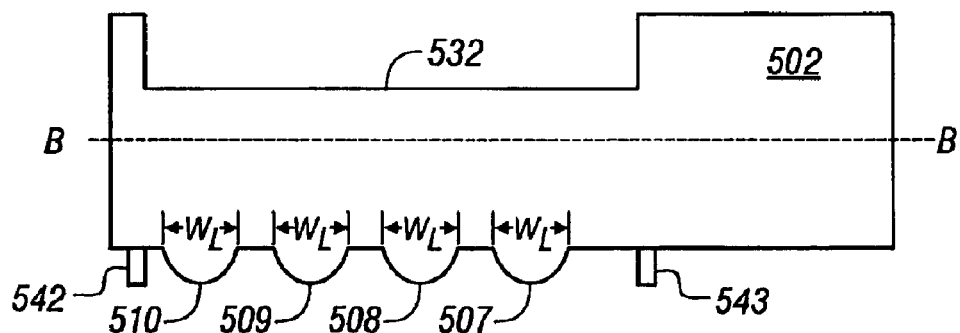

FIG. 5I shows a cross section of lens block 502 along axis B—B. In some embodiments, the overall length of lens block 502 along axis B—B can be about 7 mm. The thickness t of lens block 502 along axis B—B, except in the area of reflecting surface 532, is the same as that shown for the thickness in FIG. 5G. Tabs 542 and 543 are identical with tabs 544 and 545 and can be separated by a distance of about 4 mm. Lenses 507, 508, 509, and 510 can have a diameter $W_L$ of about 980 microns and a pitch of about 1 mm. The center of lens 510 can be a distance of about 1.5 mm from surface 576 (see FIG. 5F) and a distance of about 1.5 mm from surface 577 (see FIG. 5F). Surface 576 can be arranged to be parallel with surface 574 of mirror-filter block 515 and thus perpendicular to surface 573 of lens block 502.

Figure 5J:
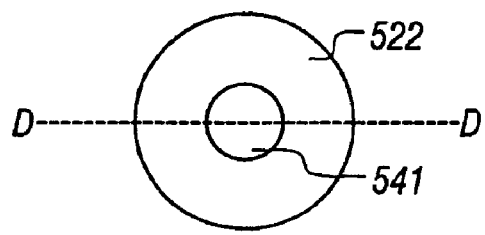

FIG. 5J shows a cross-section of lens block 502 along axis D—D, i.e. a cross-section of barrel 522. Barrel 522 can be cylindrical in shape with fiber access 541 in some embodiments having a diameter of about 2.5 mm in order to accept single mode, multi-mode, silica, or plastic optical fibers. The outer diameter of barrel 522 can, then, be about 4 mm. Barrel 522 can be molded with the lens block as a single piece or as a separate piece fitting onto a post on the lens block.

Figure 5K:
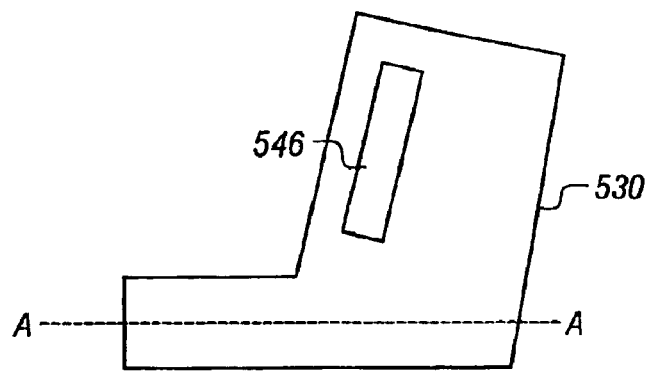
Figure 5L:
Figure 5M:
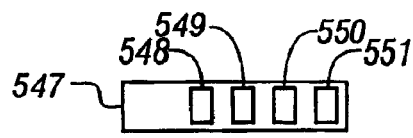
Figure 5N:

FIGS. 5K and 5L show an embodiment of base 530. Base 530 can be made of any supporting material such as plastic. The dimensions of base 530 need only be such that assembled demultiplexer is mounted on base 530. Access 546 is placed and shaped such that tabs 544 and 545 (FIG. 5H) and tabs 542 and 543 (FIG. 5I) fit snugly within access 546. The thickness of base 530 is sufficient so that optical detectors 511, 512, 513, and 514 can be supported within base 530 such that light from lenses 507, 508, 509, and 510, respectively, is normally incident on detectors 511, 512, 513, and 514, respectively. FIGS. 5M and 5N show device support 547 which is inserted within access 546. Optical devices 511, 512, 513, and 514 are positioned and fixed within supports 548, 549, 550, and 551, respectively. The pitch of devices 511, 512, 513, and 514 matches that of lenses 507, 508, 509, and 510. The diameters of the optical detectors, which can be about 80 microns, is sufficient that a focused beam of light from lenses 507, 508, 509, and 510 is captured within the surface area. In some embodiments, support 547 is arranged such that devices 511, 512, 513, and 514 are positioned at the focal length from lenses 507, 508, 509, and 510 when support 547 is positioned within access 546. In that case, support 547 has a thickness such that it forms a spacer between the lens vertex and the detector of about 800 microns, the focal length of lenses 507, 508, 509 and 510.

Optical devices 511, 512, 513, and 514, if component 500 is a demultiplexer can be any device for converting optical signals to electrical signals, including pin photodiodes and avalanche photodiodes. In some embodiments, optical detectors are InGaAs detectors, which have a thickness of about 500 microns and surface diameter of about 80 micron. If component 500 is a multiplexer, then optical device 511 through 514 can be any kind of device for converting electrical signals to optical signals. Additionally, in the case of multiplexer or demultiplexer, optical devices 511 through 514 can be optical fibers.

Figure 5O:
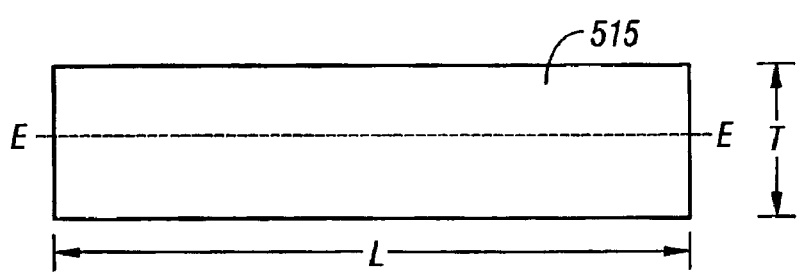
Figure 5P:
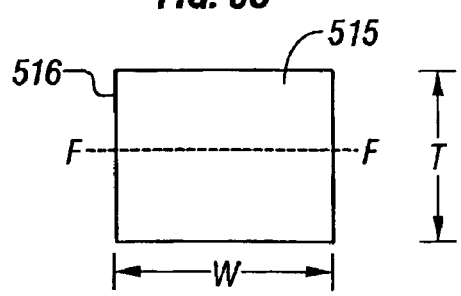

FIGS. 5O and 5P show a cross section of mirror-filter block 515 along axis E—E (see FIG. 5F) and F—F (see FIG. 5F), respectively. Mirror-filter block 515 has a length and width as described above and a thickness t equal to the thickness of lens block 502. Mirrored surface 516 can be formed by sputtering or evaporating a metallic film, such as silver or gold, or by forming an appropriate thin film to reflect light with little loss.

Figure 5Q:
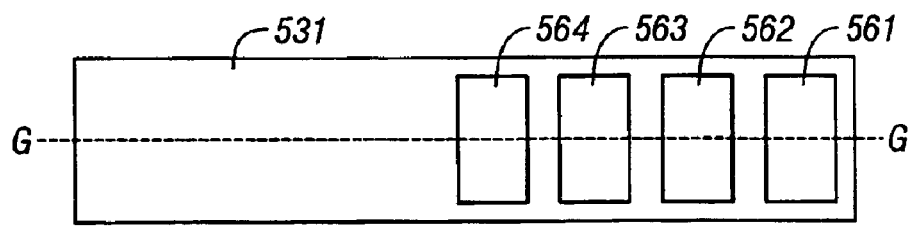
Figure 5R:
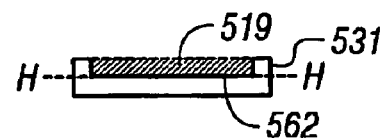

FIGS. 5Q and 5R show an embodiment of filter support 531. Filter support 531 is a glass slide which fits within the access area between surfaces 572 and 573 (See FIG. 5F). Access supports 561, 562, 563, and 564 are formed in support 531 to position optical filters, which can have an area of about 1×mm 1.6 mm and a pitch of about 1.05 mm, appropriately.

FIG. 6 shows an embodiment of a filter placement tool 610 for epoxying filters directly to surface 572 of mirror-filter block 515 (FIG. 5F). Tool 610 fits snugly over surface 573 of mirror-filter block 515 and provides accesses 613, 614, 615, 616 just large enough to allow filters to be epoxied to surface 573. Accesses 613, 614, 615, and 616 are positioned appropriately to position filters 517, 518, 519 and 520.

Figure 7A:
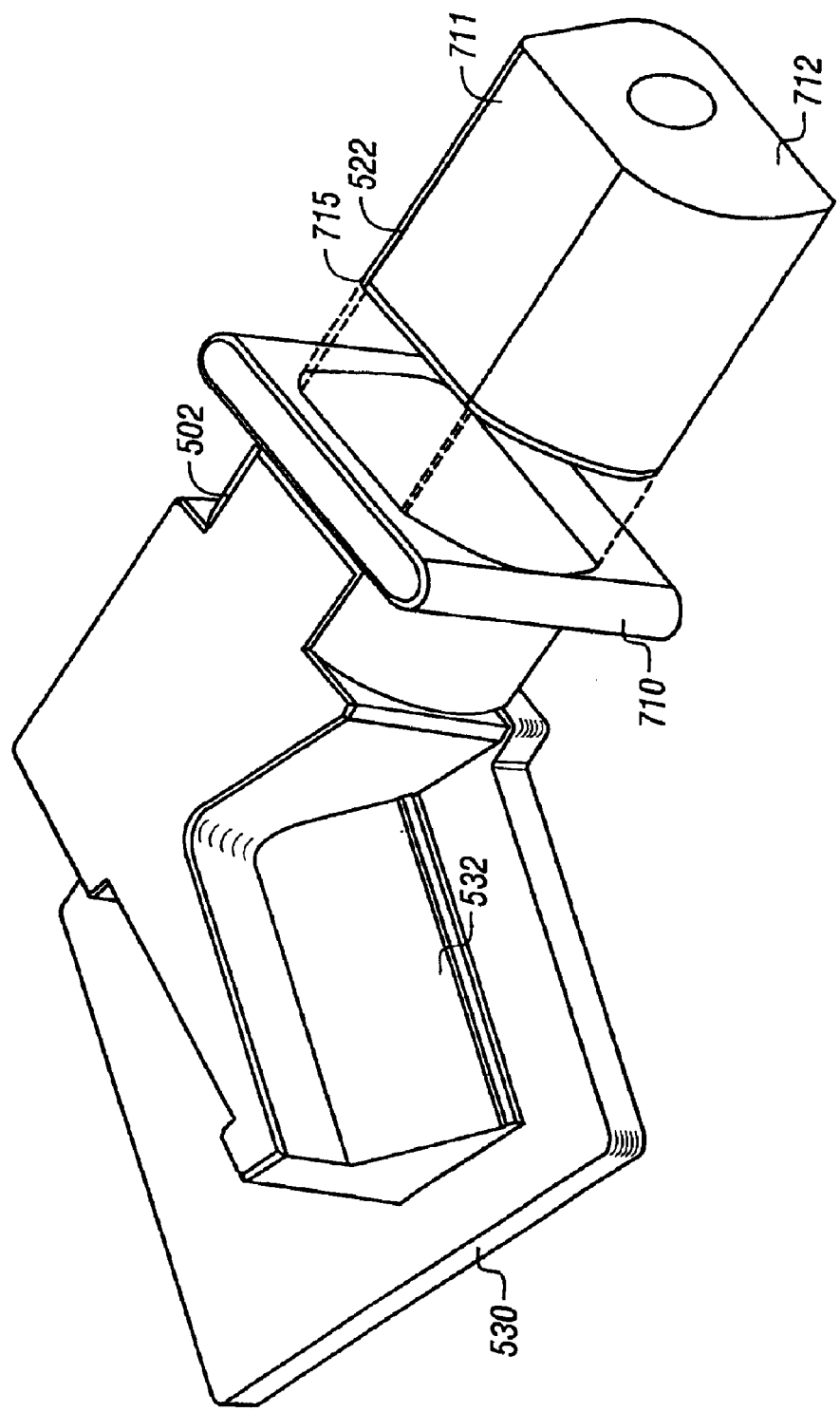

FIGS. 7A through 7D shows an embodiment of component 500 where lens 506 is mounted in post 710. As shown in FIG. 7A, post 710 is attached to lens body 502. In some embodiments, post 710 is integrally formed with lens body 502. In other embodiments, post 710 is formed separately and attached to lens body 502 by sliding post 710 over a portion of lens body 502 upon assembly. Barrel 522, shown detached in FIG. 7A, is then slidably attached to post 710. In some embodiments, barrel 522 includes a lip portion 715 and flat portions 711 and 712 in order to facilitate alignment as barrel 522 is slid into a matching receiving portion of post 710. In some embodiments, lens portion 502 may also have flat portions and a lip portion in order to facilitate the sliding of post 710 onto lens portion 502. In some embodiments, barrel 522 and post 710 are epoxied to fix barrel 522 onto post 710.

Figure 7B:
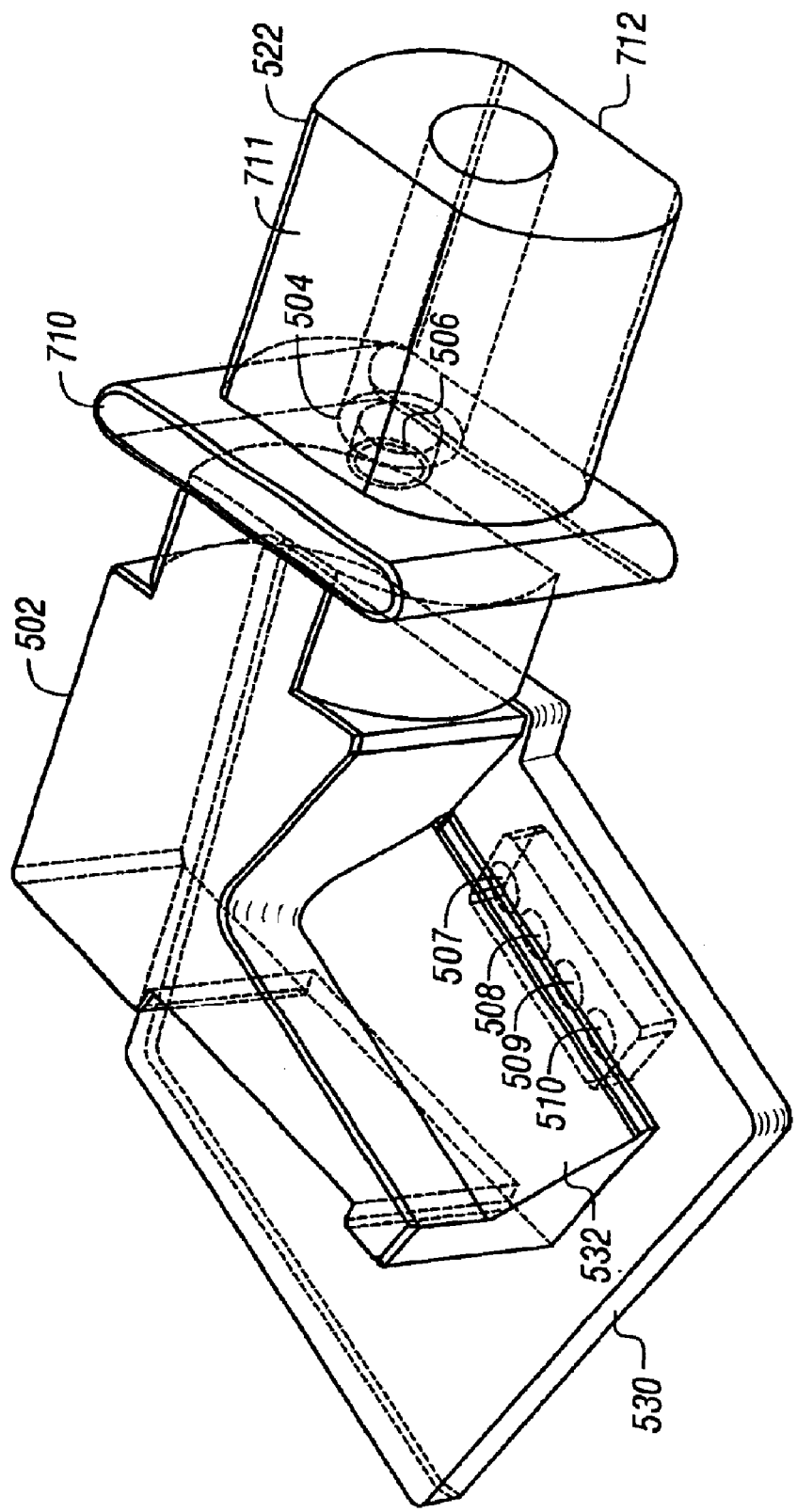

FIG. 7B shows barrel 522 attached to post 710. FIG. 7B further shows lens 506 in post 710. Fiber stop 504 may be integrally formed with barrel 522 or, in some embodiments, may also be formed in post 710.

FIG. 7C shows the assembly of filter holder 531, with filters 517 through 520, mirror block 515, base 530, and lens block 502. As previously discussed, filters 517 through 520 and filter block 515 are positioned and epoxied to lens block 502 with the alignment of optical components accomplished passively.

Figure 7D:
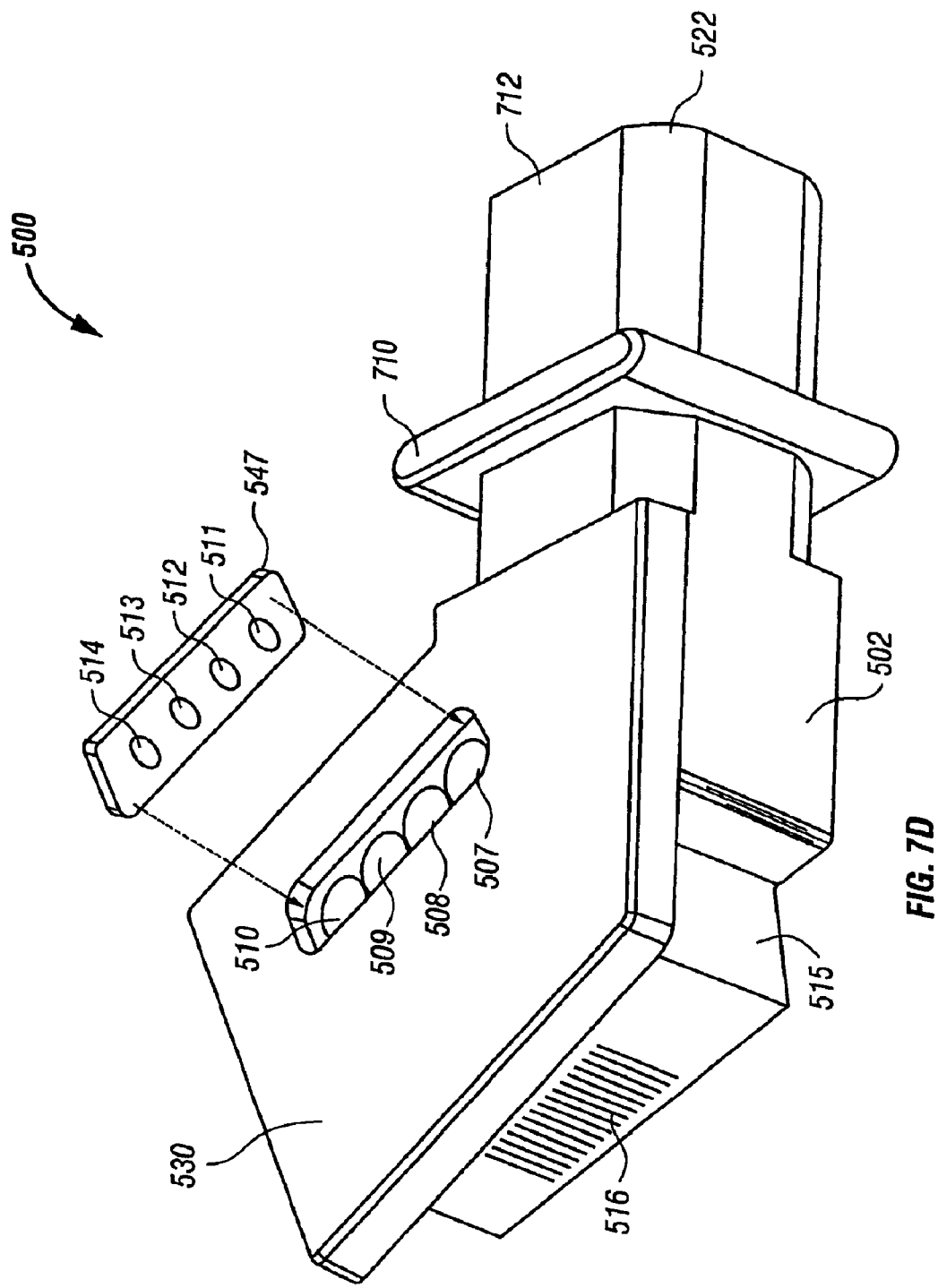

FIG. 7D shows the assembly of optical devices 511 through 514, which are mounted on holder 542 as previously discussed, with lens block 502. Holder 542 is inserted through the access in base 530 so that, when inserted, optical devices 511 through 514 are aligned with lenses 507 through 510, respectively.

As can be seen from the embodiments described in FIGS. 2A through 7D above, a demultiplexer according to the present invention is alligned passively during assembly of the injection molded lens block and the mirror-filter block. Filters can be positioned on a surface of mirror-filter block, as shown in FIG. 6, or can be positioned on a support structure which is inserted within an access area between the lens block and the mirror-filter block. Throughout the demultiplexer, light is incident on lenses along the optical axis of the lens in order to prevent loss of optical signal through astigmatism.

The embodiments of the invention disclosed above are exemplary only and are not considered to be limiting. Additionally, one skilled in the art will recognize that a multiplexer is within the scope of this invention when the optical detectors are replaced by optical sources for conversion of electrical signals into optical signals. One skilled in the art will recognize several modifications which are within the scope of this disclosure. As such, the invention is limited only by the following claims.

What is claimed is:

1. An optical component, comprising:
   a lens block optically coupled to an optical fiber;
   a collimating lens coupled between the lens block and the optical fiber;
   a mirror-filter block positioned with respect to the lens block so that light entering the mirror-filter block from the lens block is wavelength separated through a plurality of reflections between a flat mirror surface and a plurality of filters coupled between the lens block and a lens array;
   a plurality of focusing lenses formed on the lens array, each of the plurality of focusing lenses optically coupled to one of the plurality of filters.

2. The component of claim 1, wherein the collimating lens couples light between the optical fiber and the lens block.

3. The component of claim 1, wherein the plurality of focusing lenses of the lens array are integrally formed on the lens block.

4. The component of claim 1, wherein the collimating lens is integrally formed with the lens block.

5. The component of claim 1, wherein each of the plurality of focusing lenses focuses light received from one of the plurality of filters onto one of a plurality of optical detectors.

6. The component of claim 1, wherein each of the plurality of focusing lenses focuses light from one of the plurality of filters onto an optical fiber.

7. The component of claim 1, wherein each of the plurality of focusing lenses collimates light from one of a plurality of optical sources.

8. The component of claim 1, further including a barrel portion coupled to the lens block for receiving and positioning an optical fiber with respect to the lens block.

9. The component of claim 8, wherein the barrel portion is integrally formed with the lens block.

10. The component of claim 8, further including a post upon which the barrel portion can be attached.

11. The component of claim 10, wherein the post is integrally formed with the lens block.

12. The component of claim 10, wherein the post is attachable to the lens block.

13. The component of claim 1, wherein the collimating lens is integrally formed with the lens block.

14. The component of claim 1, wherein the collimating lens is positioned within lens supports, the lens supports being integrally formed within the lens block.

15. The component of claim 1, wherein the plurality of focusing lenses are integrally formed within the lens block.

16. The component of claim 1, wherein each of the plurality of focusing lenses are such that light travels through the focusing lens substantially parallel with an optical axis of the focusing lens.

17. The component of claim 1, wherein the lens block includes a reflecting surface to direct the light between each of the plurality of filters and one of the plurality of focusing lenses.

18. The component of claim 1, wherein the lens block is formed by injection molding of a substantially transparent material.

19. The component of claim 1, wherein the mirror-filter block is formed by polishing a glass block.

20. The component of claim 1, wherein the mirror-filter block includes coating on one face.

21. The component of claim 1, wherein the lens block, the mirror-filter block, and the filters are positioned on a base and affixed with an adhesive.

22. A method of demultiplexing a beam of light transmitted by an optical fiber, comprising:
   collimating the beam of light with a collimating lens;
   separating each wavelength of light from the beam of light by reflecting the beam of light between a flat mirror and a plurality of optical filters, each of the plurality of optical filters passing light in a narrow region about a specified wavelength;
   propagating light passed through each of the plurality of optical filters substantially along the optical axis of one of a plurality of focusing lenses;
   focusing light from each of the plurality of optical filters with one of the plurality of focusing lenses.

23. The method of claim 22 wherein focusing light includes focusing light onto a plurality of optical detectors, each of the plurality of optical detectors positioned to receive light from one of the plurality of focusing lenses.

24. The method of claim 22, wherein focusing light includes focusing light onto a plurality of optical fibers, each of the plurality of optical fibers positioned to receive light from one of the plurality of focusing lenses.

25. A method of multiplexing light, comprising:
   receiving light from a plurality of light sources, each of the plurality of light sources transmitting an optical signal with light of a specified wavelength;
   collimating the light from each of the plurality of light sources with a plurality of focusing lenses;
   transmitting the light from each of the plurality of light sources into an optical filter that passes light from one of the plurality of light sources and reflects light from the remainder of the plurality of light sources;
   reflecting light between the plurality of light sources and a flat reflecting surface so as to combine the light from each of the plurality of light sources into a single beam;
   focusing the single beam onto an optical fiber with a collimating lens.

26. A method of forming an optical component comprising:
   injection molding a lens block, the lens block including lens positions for a collimating lens and a plurality of focusing lenses placed such that light incident on the collimating lens and the plurality of focusing lenses is parallel with an optical axis of each of the collimating lens and the plurality of focusing lenses;
   preparing a mirror-filter block, the mirror-filter block having flat mirror;
   positioning the mirror-filter block relative to the lens block;
   positioning a set of filters between the lens block and the mirror-filter block so that light input to the collimating lens is separated into wavelengths associated with the set of filters by reflecting the light between the flat mirror and the set of filters;
   epoxying the lens block, the mirror-filter block, and the filters to form the optical component.

* * * * *

UNITED STATES PATENT AND TRADEMARK OFFICE
CERTIFICATE OF CORRECTION

PATENT NO. : 6,870,976 B2
DATED : March 22, 2005
INVENTOR(S) : Yeou-Yen Chen et al.

It is certified that error appears in the above-identified patent and that said Letters Patent is hereby corrected as shown below:

<u>Title page,</u>
Item [75], Inventor, change "Joseph Wai" to -- John Wai --.

Signed and Sealed this

Fifth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,870,976 B2
DATED : March 22, 2005
INVENTOR(S) : Yeou-Yen Chen et al.

It is certified that error appears in the above-identified patent and that said Letters Patent is hereby corrected as shown below:

<u>Title page,</u>
Items [12] and [75], Inventors, change "Yeou-Yen Chen" to -- Yeou-Yen Cheng --.

Signed and Sealed this

Eighth Day of November, 2005

JON W. DUDAS
*Director of the United States Patent and Trademark Office*